United States Patent [19]

Butwell

[11] 4,093,701
[45] June 6, 1978

[54] PROCESS FOR ACID GAS REMOVAL

[75] Inventor: Kenneth Francis Butwell, Newburgh, N.Y.

[73] Assignee: Union Carbide Corporation, New York, N.Y.

[21] Appl. No.: 723,161

[22] Filed: Sep. 17, 1976

Related U.S. Application Data

[63] Continuation-in-part of Ser. No. 627,211, Oct. 30, 1975, abandoned.

[51] Int. Cl.² ............................................. B01D 53/34
[52] U.S. Cl. .................................................. 423/228
[58] Field of Search ................................. 423/244–229

[56] References Cited

U.S. PATENT DOCUMENTS

| | | | |
|---|---|---|---|
| 2,083,213 | 6/1937 | Baehr et al. | 423/228 |
| 3,266,866 | 8/1966 | Bally et al. | 423/229 |
| 3,563,695 | 2/1971 | Benson | 423/229 |
| 3,622,267 | 11/1971 | Bartholome | 423/229 |

FOREIGN PATENT DOCUMENTS

| | | | |
|---|---|---|---|
| 947,045 | 5/1974 | Canada | 423/229 |

OTHER PUBLICATIONS

Nonhebel, "Gas Purification Processes", George Newnes Ltd., London, 1964, pp. 121–123.
Masterson et al., "Chemical Principles", W. B. Saunders Co., Philadelphia, 2d. Ed., 1969, pp. 281–283.
Miller et al., "Selective Absorption of Hydrogen Sulfide", The Oil and Gas Journal, Apr. 27, 1953, pp. 175, 176, 177, 180 & 183.

Primary Examiner—Earl C. Thomas
Attorney, Agent, or Firm—Dominic J. Terminello

[57] ABSTRACT

A continuous process for the selective absorption of hydrogen sulfide from a feed gas comprising an acid gas mixture of carbon dioxide and hydrogen sulfide is provided which comprises counter-currently contacting the feed gas with an aqueous alkanolamine solution in an absorption zone having from two to ten separate stages, contacting the feed gas in each stage with lean aqueous alkanolamine solution and withdrawing rich aqueous alkanolamine solution from the bottom of each stage, in each stage maximizing the equilibrium approach between the hydrogen sulfide in the gas and liquid phases and minimizing the equilibrium approach between the carbon dioxide in the gas and liquid phases, and maintaining the rich solution loading in each stage within the range from about 0.1 to about 0.3 mole of acid gas per mole of alkanolamine. The absorption zone is operated in combination with a stripping zone to which rich aqueous alkanolamine solution is passed and in which lean solution is generated. The particular multi-stage absorption process of the invention allows for the recovery as stripping zone overhead of gaseous product in which the combined molar ratio of carbon dioxide to hydrogen sulfide is no greater than about 6.

28 Claims, 1 Drawing Figure

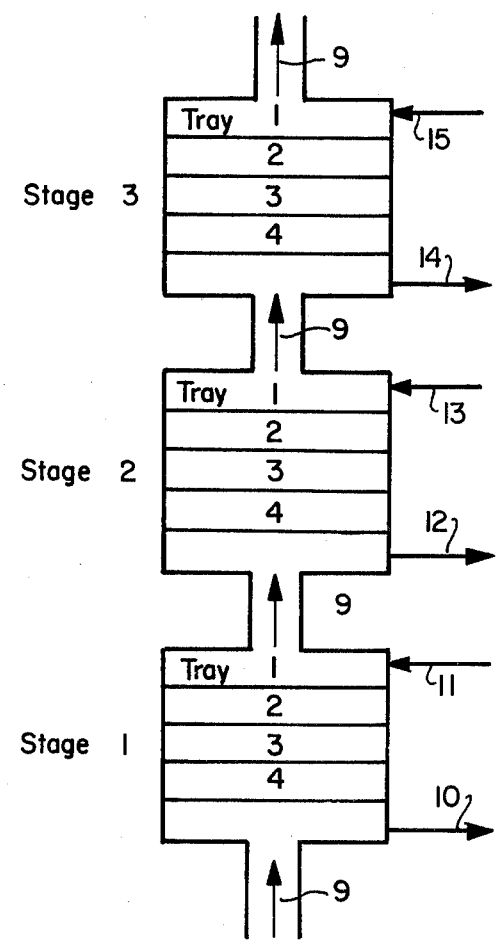

PROCESS FOR ACID GAS REMOVAL

This application is a continuation-in-part of my prior and copending application Ser. No. 627,211, filed Oct. 30, 1975, now abandoned.

FIELD OF THE INVENTION

This invention relates to a process for acid gas removal and, more particularly, to the selective removal of hydrogen sulfide from various gas streams.

BACKGROUND OF THE INVENTION

The selective removal of hydrogen sulfide from carbon dioxide containing gas streams by absorption is an important, albeit highly specialized, segment of industrial technology. Hydrogen sulfide is especially useful in the manufacture of elemental sulfur, but in order to use it effectively, the hydrogen sulfide should be made available in a molar ratio of carbon dioxide to hydrogen sulfide approaching and preferably no greater than about 6. In some applications such as, for example, in a Claus plant, the molar ratio should be no greater than about 3. Since the usual molar ratios found in typical feedstocks such as natural gas and synthetic natural gas, are in the neighborhood of about 5 to about 140, reduction of these ratios is usually a prerequisite to the use of hydrogen sulfide so obtained. This means that the selectivity of any commercially acceptable selective absorption process must be such that a high proportion of carbon dioxide passes through the absorber unabsorbed while a small proportion of the hydrogen sulfide follows that same path. The most advantageous process from a competitive point of view is, of course, the one which is most selective and has apparatus and energy requirements equal to or less than other commercial processes.

A principal object of this invention, therefore, is to provide a process for the selective removal of hydrogen sulfide from carbon dioxide containing gas streams whereby the selectivity is such that molar ratios of carbon dioxide to hydrogen sulfide approaching about 6, and preferably about 3, or less are realized for the overall process while maintaining other process requirements at levels equal to or better than competitive processes.

Other objects and advantages of the present invention will become apparent from the following description and disclosure.

SUMMARY OF THE INVENTION

The present invention provides improvement upon a continuous process for the selective absorption of hydrogen sulfide from a feed gas comprising an acid gas mixture of carbon dioxide and hydrogen sulfide, said process comprising the steps of (I) countercurrently contacting the feed gas in an absorption zone with a lean aqueous alkanolamine solution to provide a rich aqueous alkanolamine solution, (II) introducing the rich solution into a stripping zone to provide a mixture of acid gas and water vapor overhead and lean solution as bottoms, and (III) recycling the lean solution to the absorption zone, the said improvement comprising:

(a) using an alkanolamine having the structural formula,

where R is an alkanol radical of 2 or 3 carbon atoms and is unsubstituted or methyl-substituted, or an alkyl radical having 1 to 5 carbon atoms provided that at least one R is an alkanol radical;

(b) using a lean solution which has a molality of about 1.5 to about 75 and a maximum loading of about 0.1 mole of acid gas per mole of alkanolamine;

(c) using an absorption zone having 2 to 10 separate stages, wherein the equilibrium approach between the hydrogen sulfide in the gas and liquid phases is maximized and the equilibrium approach between the carbon dioxide in the gas and liquid phases is minimized;

(d) adjusting the flow rate of the lean solution through each stage so that (i) from about 0.1 to about 0.9, by volume, of the hydrogen sulfide passing through each stage is absorbed by the lean solution passing through said stage, and (ii) the rich solution loading in each stage is from about 0.1 to about 0.3 mole of acid gas per mole of alkanolamine; and (e) introducing lean solution from the stripping zone into about the top of each stage, removing rich solution from about the bottom of each stage and introducing rich solution into the stripping zone. Recoverable as stripping zone overhead is gaseous product in which the molar ratio of carbon dioxide to hydrogen sulfide is no greater than about 6.

The combination of conditions employed in accordance with the teachings of this invention allows for essentially complete removal from the feed gas of hydrogen sulfide in high selectivity relative to carbon dioxide, in that the conditions are such that displacement of absorbed hydrogen sulfide by carbon dioxide in the feed gas is minimized and the driving force for hydrogen sulfide absorption is maximized, as explained in greater detail hereinbelow.

BRIEF DESCRIPTION OF THE DRAWING

The sole FIGURE of the drawing is a schematic flow diagram of an illustrative embodiment of the present invention.

DETAILED DESCRIPTION AND PREFERRED EMBODIMENTS

As noted above, in addition to the steps and conditions stated heretofore, each stage of the absorption process functions in a particular manner to accomplish the optimum level of selectivity which can be achieved by the presently described process. The function of the selective removal process of this invention encompasses two primary aspects. The first aspect is to maximize the equilibrium approach between hydrogen sulfide in the liquid and gas phases, and minimize the equilibrium approach between the carbon dioxide in the liquid and gas phases. The ability to control these equilibrium approaches is associated with the mass transfer characteristics of the vapor-liquid system. That is, the equilibrium approach between $H_2S$ in the gas and liquid phases is enhanced through any of several techniques designed to increase gas phase mass transfer rate. Furthermore, the equilibrium approach between the $CO_2$ in the gas and liquid phases is minimized through techniques capable of reducing the mass transfer rate in the liquid phase.

In both cases, these effects may be induced through the proper tray design and selection of operating conditions. There are several means of achieving this particular aspect. One practical means, as an example, is to operate with a high superficial feed gas velocity through each stage sufficient to increase gas phase mass transfer rates without significantly increasing the liquid phase mass transfer rate by maintaining relatively quiescent liquid phase behavior. Another practical means may be utilized in systems already possessing high gas phase mass transfer characteristics. Here, the velocity of feed gas through each stage and tray, or tray equivalent, is inhibited to such an extent that the flow is sufficient but essentially no greater than that flow which is required to maintain the solution on the tray. In so doing, the liquid mass transfer rates and rich solvent acid gas loadings are reduced, thus further minimizing the equilibrium approach between the $CO_2$ in the gas and liquid phases.

A second and equally important aspect of the process of the present invention is to maintain the rich solution loadings in the range of about 0.1 to 0.3 mole of acid gas per mole of alkanolamine. At greater loadings, as the absorption of $CO_2$ and $H_2S$ begins to approach nearer and nearer to equilibrium, the $CO_2$ will begin to displace absorbed $H_2S$ in view of the fact that carbon dioxide is a stronger acid than hydrogen sulfide. Such displacement is undesirable because selectivity toward net hydrogen sulfide absorption is adversely affected. Furthermore, maintenance of the net solution loadings within the aforesaid range serves to keep a high rate of $H_2S$ transfer from the gas phase into the liquid phase by minimizing the increase in the partial pressure of $H_2S$ above the solution. To be considered in this latter respect is the fact that the partial pressure of hydrogen sulfide above the solution is influenced by two factors. First, as $H_2S$ loading increases, the partial pressure of $H_2S$ above the solution rises. Secondly, and importantly, an increase in $CO_2$ loading will also raise the $H_2S$ partial pressure above the solution. Therefore, the net driving force between $H_2S$ in the gas phase and $H_2S$ in equilibrium with the liquid phase decreases rapidly as loading increases. Multi-staging in accordance with the teachings of the present invention allows one to maximize the driving force throughout the absorber by replacement of the loaded solution at each stage with the introduction of lean solution, with its inherent low partial pressure of both acid gas components. By removing only a fraction of the acid gases per stage and not allowing the rich solution loadings to rise beyond the stated range, high selectivity toward hydrogen sulfide absorption relative to carbon dioxide absorption is obtained.

As noted, the feed gas which is fed to the absorption zone of the process of this invention comprises an acid gas containing carbon dioxide and hydrogen sulfide. The feed gas may be (A) a mixture of a process gas and the acid gas or (B) the acid gas. The process gas comprises a hydrocarbon or a mixture of hydrocarbons. Examples of hydrocarbons that can be processed in the system are methane, methane which may be in the form of natural gas or substitute or synthetic natural gas (SNG), ethylene, ethane, propylene, propane, mixtures of such hydrocarbons, and the prepurified effluents from the cracking of naphtha or crude oil or from coal gasification. There are no limits to the throughput of feed gas in the subject process provided that the apparatus is sized correctly, a conventional engineering problem.

The feed gas either contains an acid gas together with the process gas or is the acid gas itself. The acid gas is a mixture of carbon dioxide and hydrogen sulfide generally in a molar ratio of about 5 moles to about 140 moles of carbon dioxide per mole of hydrogen sulfide.

The ratio of process gas to acid gas where both are present can cover a very broad range since the process can handle any ratio. This is simply because the process gas is inert insofar as the absorbent is concerned and, aside from throughput sizing, no provision has to be made for it.

Water can be and is usually present in mixture with all of the feed gas components in the form of water vapor or droplets in amounts running from 0 to saturated and is preferably saturated since saturation minimizes water evaporation in the bottom of the absorption zone. An anhydrous feed gas may be used but is very rare. The water referred to here is not considered in the determination of molality unless and until it goes into solution with the alkanolamine.

Impurities as defined herein are represented by (a) any gas not defined above as a process gas, acid gas, or water vapor, and (b) solid particles or liquid droplets (exclusive of water droplets) in the feed gas. They can be present in amounts of up to about 3 weight percent based on the total weight of the feed gas and are preferably present in amounts no greater than about 1 weight percent and, in many cases, lower than 0.01 percent. Examples of the gaseous impurities are sulfur dioxide, carbonyl sulfide, and carbon disulfide. Examples of the solid or liquid impurities are iron sulfide, iron oxide, high molecular weight hydrocarbons, and polymers. Any olefins having more than one double bond, triple bond hydrocarbons, and as a general rule, any material that will polymerize or react in situ is an undesirable impurity.

The absorbent is a solution of an alkanolamine and water, the alkanolamine having the structural formula:

wherein each R is the same or different and can be at least one alkanol radical, which has 2 or 3 carbon atoms and is unsubstituted or methyl-substituted, or R can be an alkyl radical having 1 to 5 carbon atoms, provided at least one R is an alkanol radical.

Examples of the alkanolamines are the preferred methyldiethanolamine (MDEA), triethanolamine (TEA), ethyldiethanolamine (EDEA), tripropanolamine, and triisopropanolamine. Although mixtures of alkanolamines can be used, they are not preferred.

There is enough water in the solution or added to the system to provide a molality in the range of about 1.5 to about 75 and preferably from about 5.5 to about 12.5. The determination of molality is made on the basis of alkanolamine as solute and water as solvent wherein the molality of the solution is equal to the number of moles of solute (alkanolamine) dissolved in 1000 grams of solvent (water). The molality in subject process concerns the lean alkanolamine solution which is used to contact the feed gas in each stage of the absorption zone. Other water in the system is not considered in the determination.

Where aqueous MDEA solution (lean) is introduced into a system, the concentration thereof is generally from about 10 percent to about 90 percent by weight MDEA based on the weight of the solution and is preferably from about 45 percent to about 55 percent by weight. Again, this solution should either provide the correct molality for the process or additional water must be added to the system to do so.

Examples of typical solutions, in percent by weight, are: MDEA 50 percent - water 50 percent; TEA 60 percent - water 40 percent; and EDEA 55 percent - water 45 percent.

Although generally the amount of water for all alkanolamines lies in the range of about 10 to about 90 percent by weight based on the total weight of the solution and the solution preferably has the proper viscosity for pumping, the amount of water is determined in the end by molality in the ranges set forth above.

The apparatus used in the process for stripping, heat exchanging, and cooling as well as reboilers, filters, piping, turbines, pumps, flash tanks, etc., are of conventional design. A typical stripping or regenerator column used in the system can be described as a sieve tray tower having 15 to 20 actual trays or its equivalent in packing. The stripper contains in its base, or in an external kettle, a tubular heating element or reboiler and at the top of and external to the stripper are condensers and a water separator.

The absorber is not of conventional design, however, as will be seen below.

REFERRING TO THE DRAWING

As can be seen in the drawing, the absorber is not one column, but is divided into separate stages, which are connected to each other in series. The only direct connection between the stages is line 9 through which passes the feed gas. The liquid from one stage never enters another stage unless and until it passes through a still. There can be two to ten stages.

The number of stages is increased within the two to ten stage range in accordance with increased feed gas purification requirements. It is understood that more than ten stages can be used in special cases to achieve the ultimate in purity since only a fraction of hydrogen sulfide in the range of about 0.1 to about 0.9, by volume, is removed in each stage, that is, from about 10 to about 90 percent by volume of the hydrogen sulfide content of the feed gas passing through each stage. Normally, the fraction of hydrogen sulfide removed from the feed gas in each stage is within the range from about 0.3 to about 0.7, by volume. The removal of relatively high (i.e., up to about 0.9) or relatively low (i.e., down to about 0.1) fractions of hydrogen sulfide passing through each stage depends on the richness and leanness, respectively, of the hydrogen sulfide in the feed gas stream.

Each stage can have one to ten, and usually has no more than six, actual trays or its conventional equivalent in spray towers, co-current contactors, or packed towers, for example. In the discussion to follow, it should be understood that the terms "stage" and "tray" contemplate the use of equivalent apparatus. For example, a stage having three trays is considered to be the same as a packed tower having the packing equivalent to three trays. Least preferred are stages having more than four trays. The number of trays is selected by the operator to achieve the result desired in the work specifications with respect to combined molar ratio of carbon dioxide to hydrogen sulfide required in the stripper overhead, which in this process is set at about six or less. Assuming that the same tray design is used for each tray in the stage, the molar ratio of $CO_2$ to $H_2S$ in the rich solution in each stage will decrease as the number of the trays in the stage decreases, when operating in accordance with the teachings of the invention. Thus, it is clear that a broad range of purities and molar ratios can be achieved by this process.

From the standpoint of apparatus, the process of the present invention may be carried out in a variety of different types of absorbers. Illustrative of suitable absorbers are those equipped with sieve trays, bubble cap trays, valve trays and the like, having zero or minimum weir heights. These various types of trays may be operated in one or more specific fashions. For example, in absorbers equipped with sieve trays, the flow of feed gas through the tray may be set to such an extent that the flow is sufficient but essentially no greater than that flow which is required to maintain the solution in the tray. This may be more easily understood by referring to the Chemical Engineers' Handbook, Perry et al, 4th Edition, McGraw-Hill, 1963, Section 18, pages 18-3 to 18-24, inclusive, which pages are incorporated by reference herein. At page 18-5 it is noted that weeping takes place when the vapor flow is at a rate insufficient to maintain the liquid on the tray. Note also page 18-14 where Perry points out that "dumping" in bubblecap trays is analogous to "weeping" in sieve trays. The objective here is to provide a tray in which the rate of flow of the vapor is just sufficient to maintain the liquid on the tray, i.e., just above the weeping point. In other words, the tray is made to operate as inefficiently as possible, which must be considered rather unconventional to say the least. Even though the tray is operated in this manner, the tray design is such that the contact efficiency or area between the gas and liquid phases is maximized while minimizing the liquid hold up time on the tray or, in other words, minimizing the contact time between the gas and liquid phases. Thus, operation of a sieve tray close to the "weeping point" meets the aforesaid objective.

At this point it should be noted that, although it is desirable to operate the absorber and/or utilize trays or their equivalent such that the contact time between the gas and the liquid phases is as low as possible, thereby taking advantage of the faster rate of reaction between the alkanolamine solution and $H_2S$ relative to the rate at which $CO_2$ reacts, low contact time is only one factor to be considered in providing a highly selective $H_2S$ removal process. Counteracting the initial and inherently faster rate of absorption of $H_2S$ relative to $CO_2$, are factors such as the ability of $CO_2$ to displace absorbed $H_2S$, the rise in the partial pressure of $H_2S$ above the liquid phase as $CO_2$ is absorbed, and mass transfer characteristics. Thus, unless the displacement factor as a function of acid gas loading is minimized and the mass transfer driving forces as a function of loading, are such as to favor $H_2S$ absorption and, further, unless the $H_2S$ gas phase transfer is enhanced while minimizing $CO_2$ liquid phase transfer, a reproducibly highly selective $H_2S$ removal process is not achieved. For example, inasmuch as $H_2S$ absorption is gas-film controlled whereas $CO_2$ absorption is liquid-film controlled, operation at low contact time but with a high liquid phase transfer does not provide absorption of $H_2S$ in high selectivity.

The feed gas, which generally contains a molar ratio of carbon dioxide to hydrogen sulfide in the range of about 5 to about 140 moles of carbon dioxide per mole of hydrogen sulfide, is introduced at line 9 into stage 1 below the bottom tray (i.e., tray 4 of the drawing), the inlet temperature of the feed gas entering stage 1 being in the range of about 30° to about 43° C. The feed gas flows upwardly through stage 1 to countercurrently meet the aqueous alkanolamine solution referred to as lean solution, i.e., it contains less than about 0.1 mole of acid gas per mole of alkanolamine, which is introduced into stage 1 at tray 1 through line 11.

The pressure in stage 1 is in the range of about atmospheric pressure to about 2000 psia and is normally in the range of about 25 psia to about 1200 psia.

The lean solution enters stage 1 at a temperature which is normally in the range of about 30° C. to about 43° C.

The feed gas, which has had roughly about half of its hydrogen sulfide absorbed in passing up the stage 1 column, exits through line 9 and passes into stage 2. The stage 1 outlet temperature of the feed gas is normally in the range of about 30° to about 43° C. It is noted that there is very little heat transfer (or heat loss) from stage to stage.

The gas exiting the first stage contains a ratio, by volume, of carbon dioxide to hydrogen sulfide in the range of about 10 parts to about 280 parts of carbon dioxide per part of hydrogen sulfide, and is generally, saturated if the initial feed gas was saturated.

After the lean solution absorbs acid gas in stage 1, it is referred to as rich solution, i.e., the rich solution is a mixture of lean solution, absorbed acid gas, additional water picked up from the feed gas, and some impurities. The "rich solution loading," which is expressed as the ratio of moles of acid gas to moles of alkanolamine in the rich solution, is, in the first stage, and each stage thereafter, in the range of about 0.1 to about 0.3, as measured at about the bottom of each stage where stage outlets 10, 12, and 14 are located. The rich solution exits the first stage at or below the bottom tray (i.e., tray 4 of the drawing) at a first stage outlet temperature which is normally in the range of about 30° to about 43° C. This rich solution then proceeds to a common line, which is also fed by the rich solutions from the other stages 2 and 3 through lines 12 and 14, respectively. It will be noted that the feed gas outlet temperature and the rich solution outlet temperature are about the same, and that these temperatures remain about constant from stage to stage. While there are slight appreciations in the temperature of the solution due to the exothermic reaction, which takes place in each stage, these variations are not meaningful and are accounted for by the use of the term "about."

The absorption process is repeated in each of stages 2 and 3, the process gas, if any, with the remaining acid gas, passing along line 9 to each successive stage. The feed gas inlet temperature for each stage is in the range set forth for stage 1, i.e., each successive inlet temperature is normally from about 30° to about 43° C. In sum, the pressure is about the same in each stage; the lean solution enters each stage at about the same temperature; the outlet temperature of the feed gas for each stage is within the range set forth above for the outlet temperature of stage 1; the ratio, by volume, of carbon dioxide to hydrogen sulfide in the feed gas increases with each successive stage, the magnitude of the increase depending on the selectivity of the process; and the rich solution outlet temperature for each stage also falls within the range set for the first stage. As previously stated, the aforesaid temperatures of the lean solution and feed gas passed to each stage, as well as the temperatures of the rich solution and treated feed gas as they exit each stage, are normally within the range from about 30° to about 43° C. It is to be understood, however, that included within the scope of the present invention, is operation of the stages of the absorption zone at lower temperatures (i.e., below 30° C.), thereby favoring further increase in selectivity of hydrogen sulfide removal consistent with the kinetics of the system. Therefore, under circumstances wherein added operating costs due to cooling of the feed gas and lean solution introduced to each stage can be tolerated, the respective temperatures of the lean solution and feed gas fed to each stage can be lowered down to about 10° C. in which event the other temperatures referred to above (i.e., the temperature of the treated feed gas and rich solution as they exit each stage), will be correspondingly as low.

The combined rich solution in the common line to which rich solution from each stage is passed, passes through a heat exchanger and then into a conventional stripping zone where it enters, generally, at or near the top tray. The rich solution stripper inlet temperature is generally in the range of about 82° to about 110° C.

As noted, the lines, the heat exchanger and the stripper are conventional and not shown in the drawing.

The acid gas and some water are removed from the rich solution in the stripper by distillation. The stripper can be operated by using lower pressure and/or direct heating. Direct heating generates steam internally from the water in the rich solution and can be accomplished by passing lean solution (i.e., bottoms) through reboilers and recycling into the stripper. A mixture of acid gas and water vapor exit from the top of the stripper. There are approximately 1 to 5 moles of water per mole of acid gas in the overhead. The water can then be removed by condensation and the acid gas recovered by conventional means. All or part of the water may be recycled to the stripper as reflux, the preferred mode being to recycle sufficient water to provide the correct molality for the lean solution as noted hereinafter. It should be noted that the water in the stripper has a variety of origins, i.e., feed gas, aqueous alkanolamine solution, and reflux water.

The stripper can be operated at a pressure in the range of about atmospheric to about 65 pounds per square inch absolute (psia) and is generally operated in the range of about 25 psia to about 35 psia and normally at a lower pressure than the absorber. The lean solution leaves the stripper at a stripper bottoms outlet temperature in the range of about 100° to about 135° C. and usually about 118° C.

The "lean solution loading" is the ratio of moles of acid gas per mole of alkanolamine in the lean solution and can be about nil to about 0.1, is preferably nil to about 0.05, and is normally about 0.02.

The lean solution then passes from the stripping zone through a common line which proceeds through a heat exchanger and then branches off to lines 11, 13, and 15, which, respectively, supply stages 1, 2, and 3 of the absorption zone with lean solution. The heat exchanger is known as a lean-rich heat exchanger because the rich solution passing through it is heated up prior to its entry into the stripper and the lean solution is cooled prior to its entry into the stages of the absorber.

It is recommended that the rich solution be filtered after it leaves an absorber stage and that circulating pumps and/or turbines be used at points along the various lines to maintain the desired circulation rate.

In commercial operations there are losses in the system due to amine entrainment and vaporization, water entrainment, amine degradation, and spillage. These are conventional problems which do not affect the operation of the overall process and will not be treated here.

The lean solution flow rate (or circulation rate) is determined for each stage and is adjusted so that: (i) from about 0.1 to about 0.9, and normally from about 0.3 to about 0.7, by volume, of hydrogen sulfide passing through each stage is absorbed by the lean solution passing through said stage; and (ii) the rich solution loading at about the bottom of each stage is from about 0.1 to about 0.3 mole of acid gas per mole of alkanolamine, thereby allowing for the recovery of gaseous product, as stripping zone overhead, in which the combined molar ratio of carbon dioxide to hydrogen sulfide is no greater than about 6, and is preferably no greater than about 3.

As a rule of thumb, high rich loadings within the aforesaid range are achieved by reducing the flow rate, and low rich loadings within the aforesaid range are achieved by increasing the flow rate.

Conventional analytical techniques are used to determine amounts of various components in subject process.

It should be understood that the realization of the aforesaid molar ratios of 6 or less which is an objective and advantage of the presently described process, is not necessarily achieved or approached in each stage, but is a combined ratio achieved by the absorption zone since the rich solution from all stages is combined, as noted, and treated in toto in the stripper. This is important because, when the process deals in low ppm hydrogen sulfide areas, excellent results are achieved when compared with other processes even though molar ratios may reach even 10 for a particular stage.

The "combined molar ratio" is defined as the molar ratio of carbon dioxide to hydrogen sulfide in the stripper overhead at the end of a complete cycle, i.e., when all the steps of the process have been carried out and all of the conditions are met in all stages, and the rich solution from each stage is being fed to the stripper. It is not an average ratio for each stage.

The present invention is further illustrated by the following examples:

EXAMPLES 1 to 4

The examples are conducted according to the flow sheet in the drawing and the preferred steps and conditions in the specification.

Each absorber stage is a sieve tray contactor with sieve trays without weirs having a tray spacing of 0.15 meter. The absorber diameter is 3.6 inches.

The still or stripping zone is a packed tower, which is the equivalent of a 17 tray tower. External to the base of the still is one reboiler and external to the top of the still are a condenser, water separator, and pump.

There is a filter and lean-rich heat exchanger in the rich solution common line. There is a pump and the same lean-rich heat exchanger in the lean solution common line.

The alkanolamine used as the absorbent is methyldiethanolamine (MDEA).

The molality of the lean solution of MDEA entering each stage of the absorber is 8.4, corresponding to an initial MDEA solution which is about 50 percent by weight MDEA and fifty percent by weight water.

The apparatus is made of stainless steel (AISI types 304 and 316).

In examples 1 to 3, the feed gas is a mixture of nitrogen, carbon dioxide, hydrogen sulfide and water vapor. The feed gas is saturated and contains essentially no impurities. The nitrogen is used to simulate a process gas, which, in commercial operation, will be a mixture of one or more hydrocarbons and/or other gases such as, for example, a mixture of $CH_4$, CO and $H_2$, which are inert under the process conditions. In Examples 1 to 3, the concentration of carbon dioxide in the feed gas is 15 percent by volume, based on the total volume of feed gas exclusive of water vapor and impurities. The molar ratio of $CO_2$ to $H_2S$ in the feed gas employed in examples 1 to 3 is about 41:1.

In Example 4, the feed gas is an acid gas mixture of carbon dioxide and hydrogen sulfide and, unlike the feed gas employed in Examples 1 to 3, is not diluted with nitrogen. This feed gas is also saturated and contains essentially no impurities. Further, in Example 4, the concentration of carbon dioxide in the feed gas is 94 percent by volume and the concentration of hydrogen sulfide is 6 percent by volume, exclusive of water vapor and impurities. The molar ratio of $CO_2$ to $H_2S$ in the feed gas to Example 4 is about 16:1.

In each example, the feed gas inlet and outlet temperatures and the lean solution inlet and rich solution outlet temperatures for each stage are about 32° C.

The stripper is operated at 30 psia. The rich solution stripper inlet temperature is 104° C, the lean solution stripper outlet temperature is 118° C, the stripper reboiler temperature is also 118° C, and the stripper overhead temperature is 100° C. Conventional analytical techniques are used to determine amounts of various components.

In Examples 1 to 3, the absorber has three stages, the number of trays in each stage being as given in Table I hereinbelow. In Example 4, the absorber has six stages and the number of trays per stage is two.

Other test conditions and results are also as set forth in Table I which follows.

TABLE I

| Example | 1 | 2 | 3 | 4[1] |
|---|---|---|---|---|
| Inlet $CO_2$ to absorber, % by volume | 15 | 15 | 15 | 94 |
| Inlet $H_2S$ to absorber, % by volume | 0.3650 | 0.3650 | 0.3650 | 6 |
| Pressure in each stage, psig. | 140 | 280 | 560 | 10 |
| Feed gas rate, liters/minute /1/ | 708 | 944 | 1420 | 651 |
| Lean solution absorber inlet flow rate to each stage, cubic centimeters/minute | 355 | 700 | 550 | 800 |
| Hydrogen sulfide inlet (by volume): | | | | |
| Stage 1 | 3650ppm | 3650ppm | 3650ppm | 6.0% |
| Stage 2 | 1500ppm | 1700ppm | 1600ppm | 4.0% |
| Stage 3 | 500ppm | 650ppm | 500ppm | 2.5% |
| Stage 4 | — | — | — | 1.5% |
| Stage 5 | — | — | — | 0.75% |
| Stage 6 | — | — | — | 0.36% |
| Hydrogen sulfide outlet (by volume): | | | | |
| Stage 1 | 1500ppm | 1700ppm | 1600ppm | 4.0% |
| Stage 2 | 500ppm | 650ppm | 500ppm | 2.5% |

TABLE I-continued

| Example | 1 | 2 | 3 | 4[1] |
|---|---|---|---|---|
| Stage 3 | 170ppm | 260ppm | 200ppm | 1.5% |
| Stage 4 | — | — | — | 0.75% |
| Stage 5 | — | — | — | 0.36% |
| Stage 6 | — | — | — | 0.10% |
| Rich loadings at outlet, moles of $CO_2$ + $H_2S$ per mole of MDEA: | | | | |
| Stage 1 | 0.14 | 0.23 | 0.20 | 0.20 |
| Stage 2 | 0.16 | 0.18 | 0.16 | 0.18 |
| Stage 3 | 0.11 | 0.18 | 0.12 | 0.21 |
| Stage 4 | — | — | — | 0.20 |
| Stage 5 | — | — | — | 0.13 |
| Stage 6 | — | — | — | 0.12 |
| Stripper overhead, moles of $CO_2$ per mole of $H_2S$: | | | | |
| Stage 1 | 1.4 | 2.5 | 1.5 | 0.28 |
| Stage 2 | 4.1 | 3.3 | 3.5 | 0.46 |
| Stage 3 | 10.0 | 9.4 | 6.5 | 1.8 |
| Stage 4 | — | — | — | 2.2 |
| Stage 5 | — | — | — | 2.5 |
| Stage 6 | — | — | — | 4.5 |
| Combined | 3.0 | 3.5 | 2.6 | 1.1 |
| Number of trays: | | | | |
| Stage 1 | 2 | 1 | 2 | 2 |
| Stage 2 | 4 | 1 | 2 | 2 |
| Stage 3 | 2 | 1 | 1 | 2 [2] |
| Lean loading at inlet, moles of $CO_2$ + $H_2S$ per mole of MDEA: | | | | |
| Stage 1 | 0.035 | 0.03 | 0.015 | 0.02 |
| Stage 2 | 0.015 | 0.04 | 0.02 | 0.02 |
| Stage 3 | 0.015 | 0.03 | 0.02 | 0.02 |
| Stage 4 | — | — | — | 0.02 |
| Stage 5 | — | — | — | 0.02 |
| Stage 6 | — | — | — | 0.02 |

[1] Under standard conditions of temperature and pressure (STP).
[2] In each of remaining stages 4, 5 and 6 of example 4, the number of trays is also two.

It is evident from the above data, that the process of the present invention allows for the preferential removal of hydrogen sulfide from carbon dioxide-containing feed gas streams including feed gas containing very dilute concentrations of hydrogen sulfide, and that the hydrogen sulfide-containing gaseous product which is recovered is suitable for further industrial processing such as for the production of elemental sulfur.

What is claimed is:

1. In a continuous process for the selective absorption of hydrogen sulfide from a feed gas comprising an acid gas mixture of carbon dioxide and hydrogen sulfide, said process comprising the steps of (I) counter-currently contacting the feed gas in an absorption zone with a lean aqueous alkanolamine solution to provide a rich aqueous alkanolamine solution, (II) introducing the rich solution into a stripping zone to provide a mixture of acid gas and water vapor overhead and lean solution as bottoms, and (III) recycling the lean solution to the absorption zone, the improvement which comprises:
   (a) using an alkanolamine having the formula, $(R)_3N$, wherein R is an alkanol radical, which has 2 or 3 carbon atoms and is unsubstituted or methyl-substituted, or an alkyl radical having 1 to 5 carbn atoms, provided at least one of the R groups is an alkanol radical;
   (b) using a lean solution, which has a molality of about 1.5 to about 75 and a maximum loading of about 0.1 mole of acid gas per mole of alkanolamine;
   (c) using an absorption zone having 2 to 10 separate stages, wherein the equilibrium approach between the hydrogen sulfide in the gas and liquid phases is maximized and the equilibrium approach between the carbon dioxide in the gas and liquid phases is minimized;
   (d) adjusting the flow rate of the lean solution through each stage so that (i) from about 0.1 to about 0.9, by volume, of the hydrogen sulfide passing through each stage is absorbed by the lean solution passing through said stage, and (ii) the rich solution loading in each stage is from about 0.1 to about 0.3 mole of acid gas per mole of alkanolamine; and
   (e) introducing lean solution from the stripping zone into about the top of each stage, removing rich solution from about the bottom of each stage and introducing said rich solution into the stripping zone.

2. A process as defined in claim 1 in which the feed gas contains, in addition to the acid gas, a process gas comprising a hydrocarbon or mixture of hydrocarbons.

3. A process as defined in claim 1 in which the flow rate of the lean solution through each stage is adjusted such that no more than about 0.7, by volume, of the hydrogen sulfide passing through each stage is absorbed by the lean solution passing through each stage.

4. A process as defined in claim 1 in which the alkanolamine is methyldiethanolamine.

5. A process as defined in claim 2 in which the alkanolamine is methyldiethanolamine.

6. A process as defined in claim 3 in which the alkanolamine is methyldiethanolamine.

7. A process as defined in claim 1 in which each stage of the absorption zone has from one to six actual trays or tray equivalents.

8. A process as defined in claim 1 in which each stage of the absorption zone has from one to four actual trays.

9. A process as defined in claim 1 wherein stripping zone overhead is recovered in which the molar ratio of carbon dioxide to hydrogen sulfide is no more than about 6:1.

10. A process as defined in claim 1 wherein stripping zone overhead is recovered in which the molar ratio of carbon dioxide to hydrogen sulfide is no more than about 3:1.

11. In a continuous process for the selective absorption of hydrogen sulfide from a feed gas selected from the group consisting of (A) a mixture of a process gas and an acid gas and (B) an acid gas, where the process gas comprises a hydrocarbon or mixture of hydrocarbons and the acid gas is a mixture of carbon dioxide and hydrogen sulfide, and the said process comprises the steps of (I) counter-currently contacting the feed gas in an absorption zone with a lean aqueous alkanolamine solution to provide a rich aqueous alkanolamine solution, (II) introducing the rich solution into a stripping zone to provide a mixture of acid gas and water vapor overhead and lean solution as bottoms, and (III) recycling the lean solution to the absorption zone, the improvement which comprises:
 (a) using an alkanolamine having the formula, $(R)_3N$, wherein each R is the same or different and can be an alkanol radical, which has 2 or 3 carbon atoms and is unsubstituted or methyl-substituted, or an alkyl radical having 1 to 5 carbon atoms, provided at least one R is an alkanol radical;
 (b) using a lean solution having a molality of about 1.5 to about 75 and a maximum loading of about 0.1 mole of acid gas per mole of alkanolamine;
 (c) using an absorption zone having 2 to 10 separate stages, wherein the equilibrium approach between the hydrogen sulfide in the gas and liquid phases is maximized while the equilibrium approach between the carbon dioxide in the gas and liquid phases is minimized;
 (d) adjusting the flow rate of the lean solution through each stage so that (i) from about 0.3 to about 0.7, by volume, of the hydrogen sulfide passing through said stage is absorbed by the lean solution passing through said stage, and (ii) the rich solution loading at about the bottom of each stage is from about 0.1 to about 0.3 mole of acid gas per mole of alkanolamine;
 (e) introducing lean solution from the stripping zone into about the top of each stage and removing rich solution from about the bottom of each stage and introducing said rich solution into the stripping zone, the molar ratio of carbon dioxide to hydrogen sulfide in the stripping zone overhead being no more than about 6:1.

12. A process as defined in claim 11 wherein each stage has from one to six actual trays or tray equivalent.

13. A process as defined in claim 11 wherein each stage has one to four actual trays.

14. A process as defined in claim 11 wherein the alkanolamine is methyldiethanolamine.

15. A process as defined in claim 12 wherein the alkanolamine is methyldiethanolamine.

16. A process as defined in claim 13 wherein the alkanolamine is methyldiethanolamine.

17. In a continuous process for the selective absorption of hydrogen sulfide from a feed gas selected from the group consisting of (A) a mixture of a process gas and an acid gas and (B) an acid gas, wherein the process gas is a hydrocarbon or a mixture of hydrocarbons and the acid gas is a mixture of carbon dioxide and hydrogen sulfide, and wherein said process comprises the steps of (I) counter-currently contacting the feed gas in an absorption zone with a lean aqueous alkanolamine solution to provide a rich aqueous alkanolamine solution, (II) introducing the rich solution into a stripping zone to provide a mixture of acid gas and water vapor overhead and lean solution as bottoms, and (III) recycling the lean solution to the absorption zone, the improvement which comprises:
 (a) using an alkanolamine having the formula, $(R)_3N$, wherein R is an alkanol radical having 2 or 3 carbon atoms, or an alkyl radical having 1 to 5 carbon atoms, provided at least one R is an alkanol radical;
 (b) using a lean solution, which has a molality of about 5.5 to about 12.5 and a maximum loading of nil to about 0.05 mole of acid gas per mole of alkanolamine;
 (c) using an absorption zone having 2 to 10 separate stages, wherein the equilibrium approach between the hydrogen sulfide in the gas and liquid phases is maximized while the equilibrium approach between the carbon dioxide in the gas and liquid phases is minimized;
 (d) adjusting the flow rate of the lean solution through each stage so that (i) from about 0.3 to about 0.7, by volume, of the hydrogen sulfide passing through each stage is absorbed by the lean solution passing through said stage, and (ii) the rich solution loading at about the bottom of each stage is about 0.1 to about 0.3 mole of acid gas per mole of alkanolamine; and
 (e) introducing lean solution from the stripping zone into about the top of each stage, removing rich solution from about the bottom of each stage, introducing said rich solution into the stripping zone, and recovering as stripping zone overhead, gaseous product in which the combined molar ratio of carbon dioxide to hydrogen sulfide is no greater than about 6:1.

18. A process as defined in claim 17 wherein the alkanolamine is methyldiethanolamine.

19. A process as defined in claim 18 wherein each stage has no more than six trays or tray equivalents.

20. A process as defined in claim 18 in which each stage has no more than four actual trays.

21. A process as defined in claim 18 in which the combined molar ratio of carbon dioxide to hydrogen sulfide in the gaseous product recovered as stripping zone overhead is no greater than about 3:1.

22. In a continuous process for the selective absorption of hydrogen sulfide from a feed gas comprising an acid gas mixture of carbon dioxide and hydrogen sulfide, said process comprising the steps of (I) counter-currently contacting the feed gas in an absorption zone with a lean aqueous alkanolamine solution to provide a rich aqueous alkanolamine solution, (II) introducing the rich solution into a stripping zone to provide a mixture of acid gas and water vapor overhead and lean solution as bottoms, and (III) recycling the lean solution to the absorption zone, the improvement which comprises:
 (a) using an alkanolamine having the formula, $(R)_3N$, wherein R is an alkanol radical having two or three carbon atoms, or an alkyl radical having one to five carbon atoms, provided at least one of the R groups is said alkanol radical;
 (b) using a lean solution, which has a molality of about 1.5 to about 75 and a maximum loading of about 0.1 mole of acid gas per mole of alkanolamine;
 (c) using an absorption zone having two to ten individual stages wherein, in each stage, the equilibrium approach between the hydrogen sulfide in the gas and liquid phases is maximized and the equilibrium approach between the carbon dioxide in the gas and liquid phases is minimized;
 (d) adjusting the flow rate of the lean solution through each stage so that (i) from about 0.1 to about 0.9, by volume, of the hydrogen sulfide passing through each stage is absorbed by the lean solution passing therethrough, and (ii) the rich solution loading at about the bottom of each stage is from about 0.1 to about 0.3 mole of acid gas per mole of alkanolamine;

(e) maintaining the temperature conditions from stage to stage at a substantially constant level;

(f) introducing lean solution from the stripping zone into about the top of each stage, removing rich solution from about the bottom of each stage, and introducing said rich solution into the stripping zone; and (g) withdrawing from the stripping zone, gaseous overhead in which the combined molar ratio of carbon dioxide to hydrogen sulfide is no greater than about 6:1.

23. A process as defined in claim 22 in which the lean solution is introduced to each stage of the absorption zone at about the same temperature.

24. A process as defined in claim 22 in which the flow rate of the lean solution through each stage of the absorption zone is adjusted such that no more than about 0.7, by volume, of the hydrogen sulfide passing through each stage is absorbed by the lean solution passing through each stage.

25. A process as defined in claim 22 in which each stage of the absorption zone has from one to six actual trays or tray equivalents.

26. A process as defined in claim 22 in which the contact area of the gas and liquid phases is maximized and the contact time between the gas and liquid phases is minimized.

27. A process as defined in claim 22 in which the feed gas contains, in addition to the acid gas, a process gas comprising a hydrocarbon or mixture of hydrocarbons.

28. A process as defined in claim 22 in which the combined molar ratio of carbon dioxide to hydrogen sulfide in gaseous product withdrawn from the stripping zone is no greater than about 3:1.

* * * * *